United States Patent
Merrill

(10) Patent No.: US 7,683,953 B1
(45) Date of Patent: Mar. 23, 2010

(54) INTRA-PIXEL FIXED-PATTERN-NOISE CANCELLATION CIRCUIT AND METHOD

(75) Inventor: Richard B. Merrill, Woodside, CA (US)

(73) Assignee: Foveon, Inc., Santa Clara, CA (US)

( * ) Notice: Subject to any disclaimer, the term of this patent is extended or adjusted under 35 U.S.C. 154(b) by 1560 days.

(21) Appl. No.: 10/882,566

(22) Filed: Jun. 30, 2004

(51) Int. Cl.
*H04N 5/335* (2006.01)

(52) U.S. Cl. ..................................... 348/308
(58) Field of Classification Search ................. 348/308, 348/300, 301
See application file for complete search history.

(56) References Cited

U.S. PATENT DOCUMENTS

| 6,801,256 | B1 * | 10/2004 | Egawa et al. | 348/294 |
| 6,911,640 | B1 * | 6/2005 | Bencuya et al. | 250/208.1 |
| 6,977,685 | B1 * | 12/2005 | Acosta-Serafini et al. | 348/308 |
| 2005/0068438 | A1 * | 3/2005 | Kozlowski | 348/308 |

OTHER PUBLICATIONS

B. Pain et al., "Analysis and enhancement of low-light-level performance of photodiode-type CMOS active pixel imagers operated with sub-threshold reset", *Proc. IEEE 1999 Workshop on Charge-Coupled Devices and Advanced Image Sensors*, pp. 140-143, Jun. 10-12, 1999 Nagano, Japan.

J. Hynecek, "CDS Noise Reduction of Partially Reset Charge-Detection Nodes", *IEEE Transactions on Circuits And Systems-I: Fundamental Theory And Applications*, vol. 49, No. 3, pp. 276-280, Mar. 2002.

* cited by examiner

*Primary Examiner*—David L Ometz
*Assistant Examiner*—Dillon Durnford-Geszvain
(74) *Attorney, Agent, or Firm*—Lewis and Roca LLP

(57) ABSTRACT

A pixel sensor comprises a first reset transistor having a drain coupled to a first potential, a gate coupled to a first reset line, and a source. A second reset transistor has a drain coupled to the first reset transistor source, a gate coupled to a second reset line, and a source coupled to a photodiode cathode. A source-follower transistor has a drain coupled to the first reset transistor source, a gate coupled to the photodiode cathode, and a source. A row-select transistor has a drain coupled to the source-follower transistor source, a gate coupled to a row-select signal line, and a source coupled to a column output line. An array of these pixel sensors further comprises timing and readout circuits that control the transistors in the pixel sensor to effect a reset operation that cancels the fixed pattern of threshold variations of the source-follower transistors.

15 Claims, 5 Drawing Sheets

INTRA-PIXEL FIXED-PATTERN-NOISE CANCELLATION CIRCUIT AND METHOD

BACKGROUND OF THE INVENTION

Prior-art CMOS and related image sensors typically have a dominant fixed-pattern noise caused by the random variation of the thresholds of the source-follower readout amplifiers in the pixel sensors, necessitating a dark-pattern subtraction operation to cancel the pattern. The dark-pattern subtraction is typically implemented either as a dark-frame subtraction using a separately-captured full dark frame, or as a dark-row subtraction or correlated double sampling, using a double read of each row into difference circuits. Each of these ways slows down the chip operation, complicates the readout circuits and timing requirements, and potentially adds new sources of mismatch and noise.

What is desired is a pixel sensor circuit and operating method that removes most or all of the fixed-pattern noise due to threshold variations, at the earliest possible stage, preferably in the pixel sensor cell itself, to eliminate the requirement for dark-frame subtraction, or dark-row subtraction, or correlated double sampling, or to at least reduce the noise in images that do not go through a dark-pattern pattern correction operation.

BRIEF DESCRIPTION OF THE INVENTION

The present invention uses the source-follower readout transistor in the pixel sensor as part of the reset operation, in such a way that its threshold voltage offset that will be applied during readout is pre-cancelled in the voltage to which the sense node (the gate of the source-follower transistor) of the pixel sensor is reset.

The pixel sensor of the present invention works by bringing in the reset reference potential via the column lines, through the source-follower transistor which has been switched to a diode configuration that drops its own threshold voltage. For this to work, the source-follower transistor that pulls the column output line "up" during readout must be used to pull the sense node "down" during reset; this necessitates an initial non-critical hard pullup step before the soft pulldown reset.

The directions "up" and "down" refer to voltages in the typical nMOS circuit, which may be reversed in circuits using pMOS transistors.

A "soft" reset means a reset through a diode-like device that cuts off exponentially (current as exponential function of voltage, not of time as in an RC circuit) as the node being reset approaches a reset level. Taking the exponential characteristic of the diode or diode-connected transistor into account, as is well known, results in a "log(t)" voltage-versus-time behavior on the node being reset, which is a curve with no asymptote or limiting value per se. In practice, a sufficiently long but well-controlled reset time will result in a stable reset voltage from a fairly flat part of the log(t) curve. Some analyses and experiments indicate that a soft reset results in less thermal noise (known as kTC noise) than a "hard" or switch-based voltage reset. This kTC noise reduction is another potential advantage of the present invention.

BRIEF DESCRIPTION OF THE DRAWING FIGURES

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

Image sensors manufactured by Foveon, Inc., assignee of the present invention, typically have a source-follower readout transistor operating to pull up a column line for readout. The column line is typically operated with no load other than the column capacitance, such that there is no asymptotic settling to a particular bias current as in more typical source-follower applications. This technique avoids the column pattern noise associated with having separate independent and different column bias current sources on each column. Since the readout works this way, with a log(t) curve, its random threshold-based offset can be well matched and cancelled by the similar soft reset dynamics of the present invention.

If the voltage at the source-follower gate is reset to cancel the threshold variation, it might at first appear that the less-than-unity gain of the follower would decrease the effectiveness of the threshold cancellation. But the settling of the gate with a fixed voltage on the source (from the column line) actually puts the gate exactly where it needs to be to reproduce a constant output at the source, taking gain and body effect into account automatically. Even if the cancellation is imperfect due to second-order effects, any substantial reduction if fixed pattern noise makes the invention useful.

Figure 1:
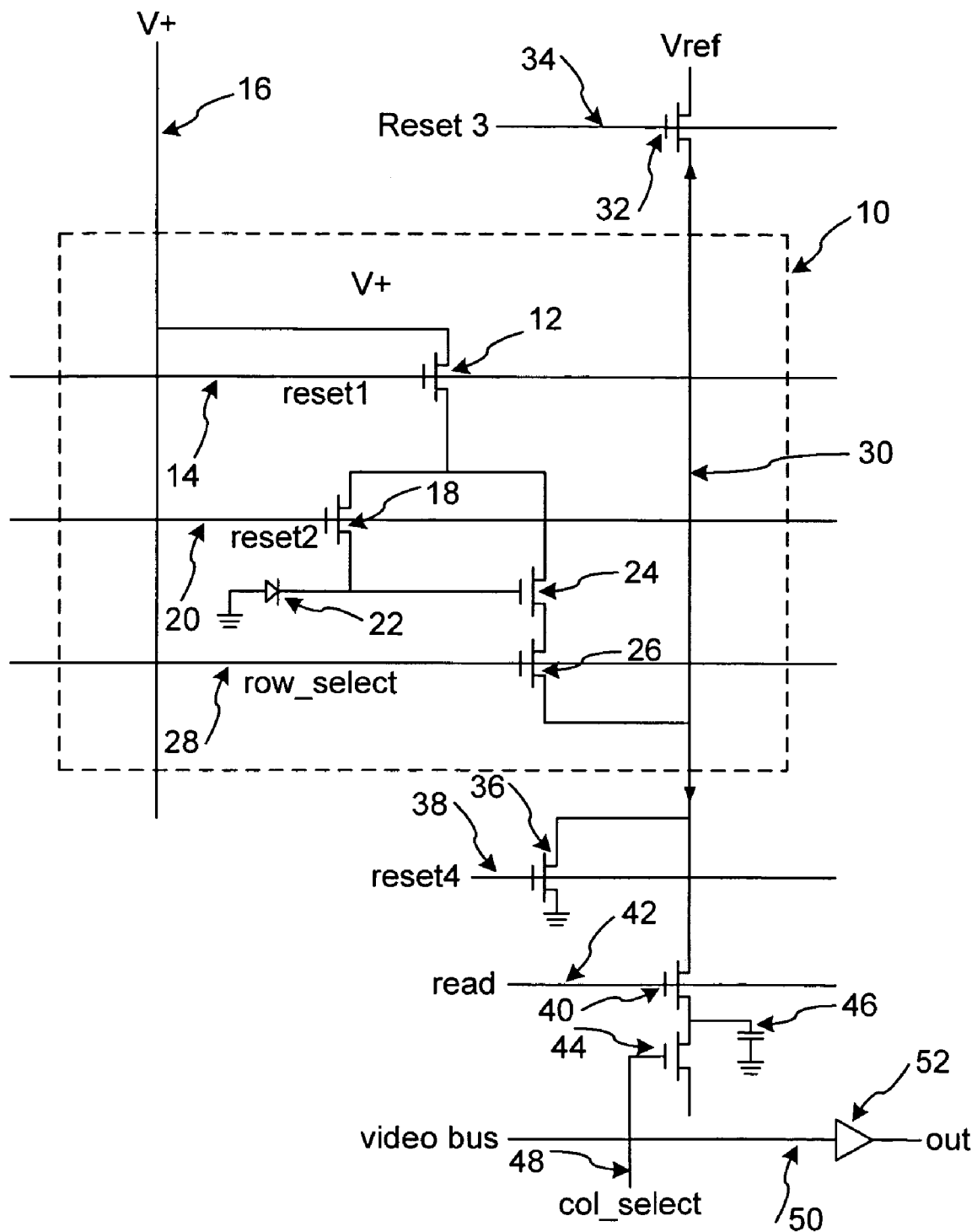
FIG. 1 is a schematic diagram illustrating the present invention in the environment of a simple single-color non-shared-readout traditional three-transistor pixel sensor cell.

Referring first to FIG. 1, a simplified drawing illustrates the present invention in the environment of a simple single-color non-shared-readout traditional three-transistor pixel sensor 10. With the invention, the pixel sensor 10 becomes a four-transistor cell (typically, though other transistors might be added for other purposes).

Pixel sensor 10 includes MOS Reset1 transistor 12, having a gate coupled to a common Reset1 signal line 14. Its drain is coupled to a supply potential V+ on line 16. MOS Reset2 transistor 18 has its gate coupled to a common Reset2 signal line 20, its drain coupled to the source of MOS Reset1 transistor 12 and its source coupled to the cathode of photodiode 22, as well as the gate of MOS source-follower transistor 24. The drain of MOS source-follower transistor 24 is coupled to the source of MOS Reset1 transistor 12 and its source is coupled to the drain of MOS row-select transistor 26. The gate of MOS row-select transistor 26 is coupled to a row-select line 28 and its source is coupled to column line 30.

As will be appreciated by persons of ordinary skill in the art, the image sensor, or array of pixel sensors that includes pixel sensor 10 has edge circuits for resetting and reading the image data, with an example embodiment including MOS Reset3 transistor 32, having a gate coupled to a Reset3 signal line 34, a drain coupled to a reset reference potential $V_{ref}$, and a source coupled to column line 30. MOS Reset4 transistor 36 has its gate coupled to a Reset4 signal line 38, its drain coupled to column line 30, and its source coupled to a column reset potential, shown as ground. MOS read transistor 40 has its drain coupled to column line 30, its gate coupled to a read signal line 42, and its source coupled to the drain of MOS column-select transistor 44 and to capacitor 46. Capacitor 46 is usually in the range of the column line capacitance (e.g., about 1 pF). The gate of MOS column-select transistor 44 is coupled to column-select line 48 and its source is coupled to video bus 50 and thereby to output amplifier 52.

Figure 2:
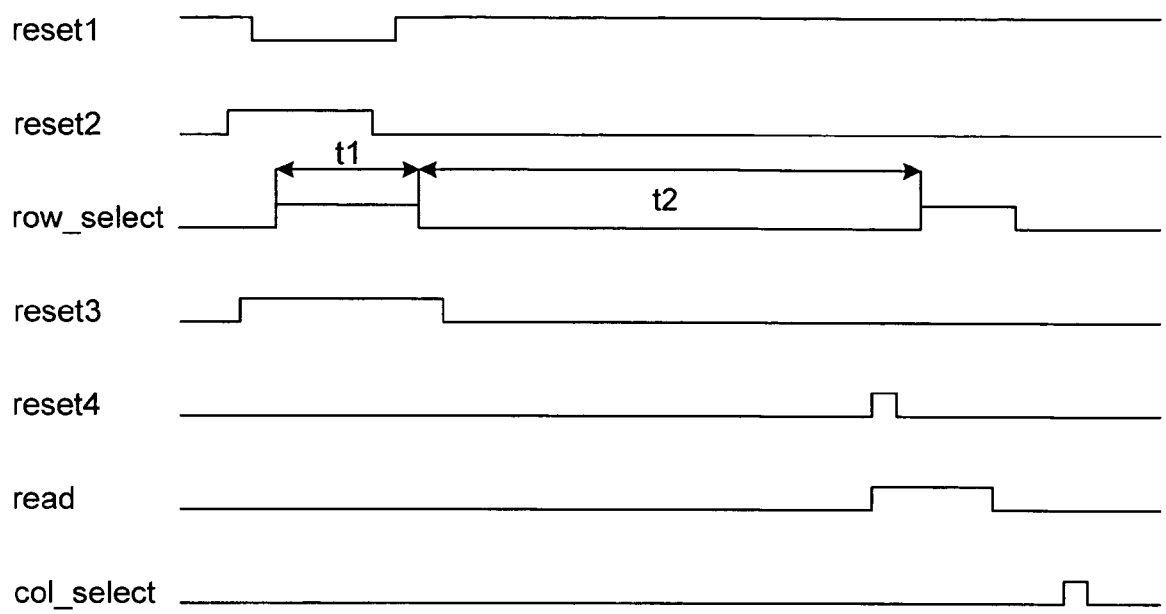
FIG. 2 is a timing diagram illustrating the operation of the circuit of FIG. 1.

Referring now to FIG. 2, a timing diagram for operating the circuit of FIG. 1 is shown. The operation of the pixel sensor 10, and the array that contains it, proceeds by first starting the "hard reset high" operation by raising both Reset1 and Reset2 signal lines 14 and 20. Reset1 signal line 14 may already be high as it was used in a previous read operation, as may be seen from FIG. 2.

Next, Reset3 signal line 32 is raised to put the dark reference potential $V_{ref}$ on the column line 30. Persons of ordinary skill in the art will appreciate that this step may be done earlier or later than shown. The Reset3 signal line 34 needs to be high for reset, and low for readout, preferably not switching near critical other edges such as the rise or fall of the row select line.

Next, the Reset1 signal line is lowered, terminating the brief "hard reset high" phase. With the Reset2 signal line still high, the MOS source-follower transistor 24 is a diode-connected transistor with its gate/drain node loaded by the combined capacitances of the sense node and the collector node.

Next, the row-select line 28 is raised, starting the "soft reset low" phase. After a predetermined time (shown as "t1") Reset2 signal line 20 and the row-select line 28 are dropped to end the "soft reset low" phase. FIG. 2 shows Reset2 dropping first, terminating the t1 phase; row select could alternatively be dropped first, or the reset operation could be terminated by raising the column line voltage above the reset reference potential $V_{ref}$ before turning off Reset2 and row select.

The integration or exposure period (shown in FIG. 2 as "t2") is then begun, by the termination of the reset operation. The low level of the Reset2 signal line 20 is chosen to bias MOS Reset2 transistor 18 to operate as an anti-blooming or overflow path, such that excess photocharge accumulated at photodiode 22 will not overflow into the substrate and contaminate other nearby pixel sensors.

The Reset3, signal line 34 is then dropped and Reset1, signal line is raised (both to provide a solid overflow path to the V+ line, for overflow charge that comes through MOS Reset2 transistor 18 in its nearly-off state, and to provide the power supply for a row read operation. The reset sequence for this row is now complete.

At this point, a different row will typically be read out using its Reset4 and read lines 38 and 42 to put a signal onto column capacitor 46, followed by column scanning using MOS column-select transistor 44 and the VideoBus 50 to amplifier 52 in the usual way.

After a row read, a next row will be reset as described above. After a sequence of row resets and reads, the row containing pixel sensor 10 being reset will be read, shown after exposure time "t2" in FIG. 2. The exact read sequence may be according to existing practice, typically as illustrated. Thus, the Reset4 signal is momentarily asserted to place the column-output line at ground and the read signal is asserted to place the capacitor 46 at ground. After the Reset4 signal is turned off, the row-select signal is asserted. This places the output signal on capacitor 46. After row-select and read are turned off, the column-select signal is asserted, placing the output voltage on the VideoBus 50.

As an alternative to resetting one row at a time, the entire array of pixel sensor cells can be reset at once by applying the timing shown to all rows simultaneously. This "global reset" may be preferable when operating a sensor in a camera that is equipped with an opto-mechanical shutter.

In the X3™ imagers manufactured by Foveon, the assignee of the present invention, pixel sensors using photodiodes at different depths in the silicon collect photocurrent from light of different wavelength ranges to sense full color. The present invention may be used in a design in which each of the three color photodiodes has its own readout transistor, column line, and reset switches, just as separate pixel sensors in a single-layer image sensor would have.

Figure 3:
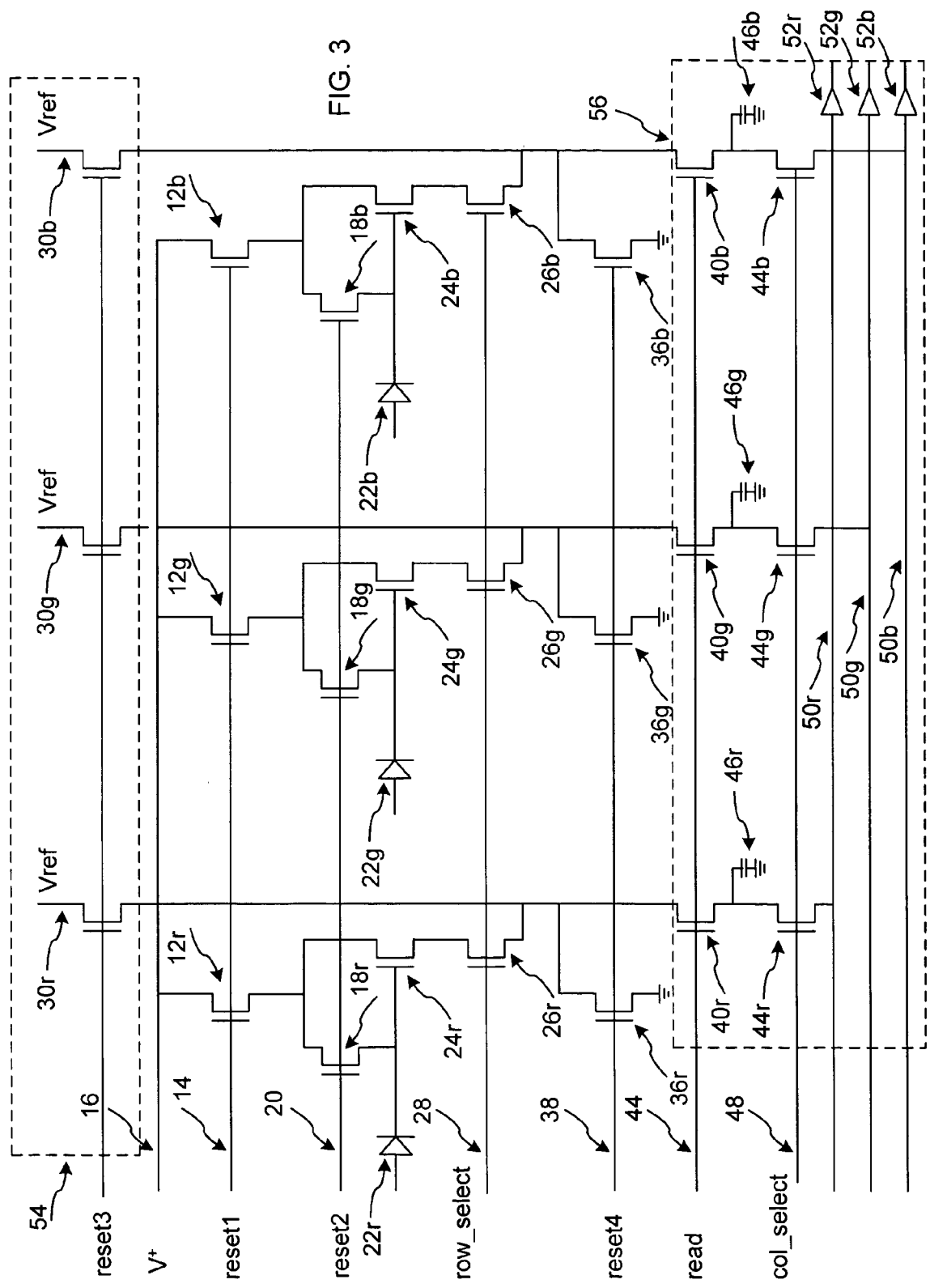
FIG. 3 is a schematic diagram illustrating the present invention in the environment of a three-color pixel sensor cell.

Referring now to FIG. 3, such an embodiment of the present invention is depicted. FIG. 3 is a schematic like that of FIG. 1, showing such a group of three pixel sensors. Elements in FIG. 3 corresponding to like elements of FIG. 1 will be designated by the same reference numerals as used in FIG. 1, followed by the suffixes "r" "g" and "b" to designate the different color sensors.

Row-select lines are shared for pixels in a row. This row-select line 28 is shown coupled to the gates of MOS row-select transistors 26r, 26g, and 26b. Reset1 and Reset2 signal lines are also typically wired by row, to allow rolling-shutter operation, though they could also be wired vertically if only global reset operation is needed. Thus, Reset1 and Reset2 signal lines 14 and 20 are shown, respectively, coupled to the gates of MOS Reset1 transistors 12r, 12g, and 12b and MOS Reset2 transistors 18r, 18g, and 18b.

Pixel reset level control 54 will include MOS Reset3 transistors 30r, 30g, and 30b. Similarly, column-read channels 56 will include MOS Reset4 transistors 36r, 36g, and 36b, MOS read transistors 40r, 40g, and 4b, capacitors 46r, 46g, and 46b, and MOS column-select transistors 44r, 44g, and 44b, coupled to video busses 50r, 50g, and 50b and their associated amplifiers 52r, 52g, and 52b in the manner shown in FIG. 1.

The present invention also allows a robust anti-blooming overflow path through MOS Reset2 transistor 18, independent of the column lines, so that overflow charge can be removed even during use of the column lines for readout. In previous designs that used column lines as reset reference potentials, the column lines were also the overflow path, and could not be used for overflow during readout, which led to some limitations on anti-blooming if readout was being done with a shutter open (electronic rolling-shutter mode, as used for accumulating long exposures in image sensors such as the Foveon F7 color image sensor).

In small-pixel versions of these X3™ devices, and in single-layer image sensors, it is becoming typical to connect several photodiodes to a single source-follower readout transistor through selection switches. The present invention is equally applicable to these circuits. The several photodiodes and the single sense node per source-follower transistor can each be reset using the offset-canceling soft reset method of the present invention, requiring only one added transistor per source follower (the MOS Reset1 transistor 12 that disconnects the source-follower drain from the power rail to allow it to be used as a reset path in conjunction with the MOS Reset2 transistor that connects the source-follower gate to its drain).

In pixel sensors that use fully-depleted photodiodes, the photodiodes do not need a soft reset operation, and only the sense node needs to be reset using the present invention.

Figure 4:
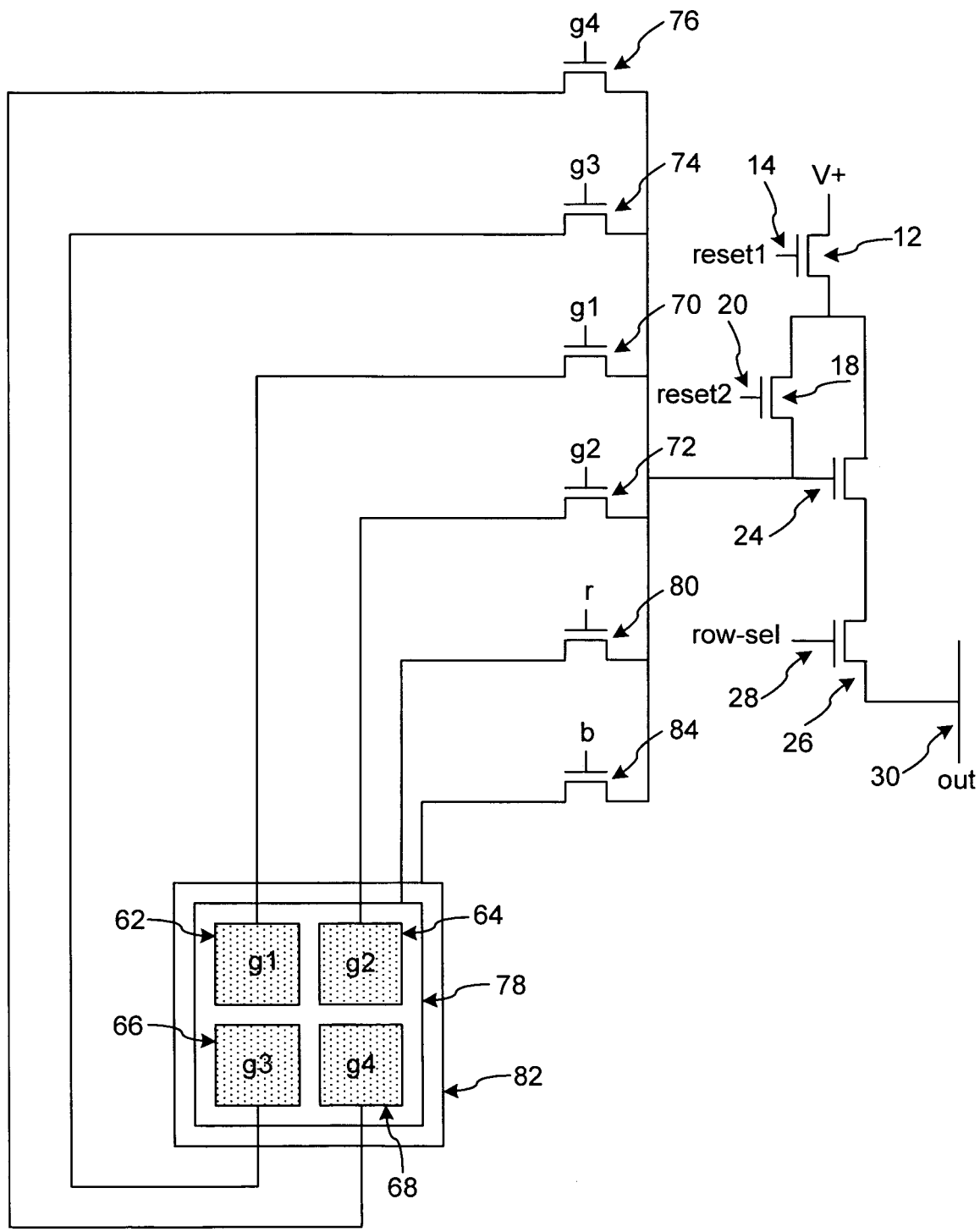
FIG. 4 is a schematic diagram illustrating the present invention in the environment of a shared-readout three-color pixel sensor cell.

Referring now to FIG. 4, another illustrative embodiment of the invention is shown in which the individual photodiodes of a three-color pixel sensor are switched to the sense node of the circuit. In the illustrative embodiment of FIG. 4, there are four green photodiodes, one red photodiode, and one blue photodiode. Persons of ordinary skill in the art will realize that the number of sensors for each color may be varied. For example, in a Bayer-pattern color-filter-matrix image sensor, each follower might serve to read out one red, one blue, and two green photodiodes. Elements in FIG. 4 corresponding to like elements of FIG. 1 will be designated by the same reference numerals as used in FIG. 1.

Thus, in FIG. 4, pixel sensor 60 includes MOS Reset1 transistor 12, having a gate coupled to a common Reset1 signal line 14. Its drain is coupled to a supply potential V+ on line 16. MOS Reset2 transistor 18 has its gate coupled to a common Reset2 signal line 20, its drain coupled to the source of MOS Reset1 transistor 12 and its source coupled to the gate of MOS source-follower transistor 24. The drain of MOS source-follower transistor 24 is coupled to the source of MOS Reset1 transistor 12 and its source is coupled to the drain of MOS row-select transistor 26. The gate of MOS row-select transistor 26 is coupled to a row-select line 28 and its source is coupled to column line 30.

However, unlike pixel sensor 10 of FIG. 1, the cathodes of the individual photodiodes in the pixel sensor are coupled to the gate of MOS source-follower transistor 24. Thus four green photodiode cathodes 62, 64, 66, and 68 are shown coupled to the gate of MOS source-follower transistor 24 through MOS color-enable transistors 70, 72, 74, and 76, respectively. A single red photodiode cathode 78 is shown coupled to the gate of MOS source-follower transistor 24 through MOS color-enable transistor 80, and a single blue photodiode cathode 82 is shown coupled to the gate of MOS source-follower transistor 24 through MOS color-enable transistor 84.

As will be appreciated by persons of ordinary skill in the art, the image sensor, or array of pixel sensors that includes pixel sensor 10 has edge circuits (not shown in FIG. 4) for resetting and reading the image data. An illustrative embodiment is the same as is depicted in FIG. 1 and includes MOS Reset3 transistor 32, having a gate coupled to a Reset3 signal line 34, a drain coupled to a reset reference potential $V_{ref}$, and a source coupled to column line 30. MOS Reset4 transistor 36 has its gate coupled to a Reset4 signal line 38, its drain coupled to column line 30, and its source coupled to a column reset potential, shown as ground. MOS read transistor 40 has its drain coupled to column line 30, its gate coupled to read signal line 42, and its source coupled to the drain of MOS column-select transistor 44 and to capacitor 46. The gate of MOS column-select transistor 44 is coupled to column-select line 48 and its source is coupled to video bus 50 and thereby to output amplifier 52.

Figure 5:
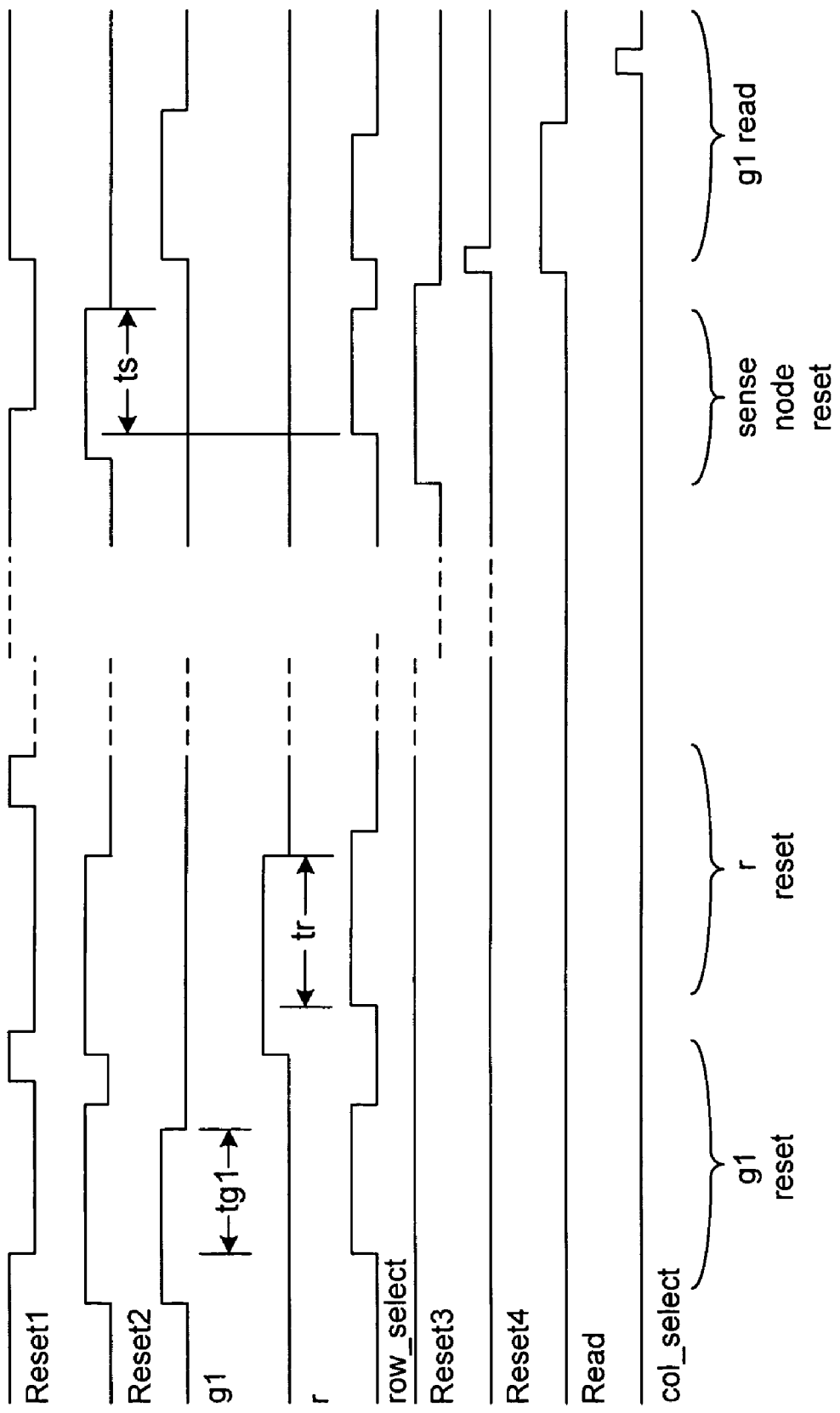
FIG. 5 is a timing diagram illustrating the operation of the circuit of FIG. 4.

As illustrated in the timing diagram of FIG. 5, the shared readout embodiment of FIG. 4 operates in a manner somewhat similar to that of FIG. 1, with the differences relating to the color sharing. First, for each color, Reset1 signal line 14, Reset2 signal line 20 and the color enable transistor of the color being reset are turned on. Then, Reset1 signal line 14 is turned off, ending the initial hard reset operation. The source-follower output transistor is now a diode-connected transistor with the gate/drain node loaded by the combined capacitance of the sense node (the gate of readout source-follower transistor 24) plus the photodiode cathode node.

Next, the column is pulled to $V_{ref}$, and row-select signal line 28 is turned on, so the source-follower output transistor is turned on slightly. Now the combined sense node and photodiode cathode node is reset to $V_{ref}$ plus the diode drop of the diode-connected MOS source-follower transistor 24 which is somewhat less than the transistor threshold of the source-follower transistor. The color-enable transistor is then turned off, ending the soft reset of its associated photodiode. This procedure is repeated to perform the soft reset for the photodiode(s) of each color. Two soft reset time periods (one for the first green diode and one for the red diode) are shown as $t_{g1}$ and $t_r$ in FIG. 5.

Integration of photocurrent then occurs, so that a charge packet is added to each photodiode. After the exposure time period, a sense node reset (the gate of the shared readout transistor) precedes each color read, during which the Reset1 signal line 14 and the Reset2 signal line 20 are turned on but the color-enable transistors remain off. The sense-node reset for the first green readout is shown at time interval $t_s$ in FIG. 5.

The Reset1 signal line 14 is then turned off, but the Reset2 signal line 20 remains on. The column is pulled to $V_{ref}$ by the Reset3 transistor, and row-select line 28 is turned on, so that the sense node is set to $V_{ref}$ plus the diode drop of the diode-connected MOS source-follower transistor 24. The Reset2 signal line 20 is turned off, ending the soft reset of the sense node, and the color-enable transistor is turned on, transferring the signal charge packet to the sense node for read. The rest of the row read and column scanning operation then proceeds in a conventional way, as described in relation to FIG. 1. This entire sequence of sense node reset and read is repeated for each color channel before advancing to the next row. Many variations on read timing are anticipated.

Referring again to FIG. 4, when Reset1 turns off, the kTC noise from that switching operation has no impact because it is followed by a redistribution of charge during the soft reset, which leaves charge noise that is at least as good, and some say better, than a hard reset. Toward the end of the soft reset operation, the source-follower transistor is essentially off, since it has pulled its gate down to the nearly-off state. Because of this nearly-off state, the Reset2 transistor is effectively not connected to anything but a small parasitic capacitance on the source-follower drain side, and therefore turning it off cannot add much uncertainty in the charge on the sense node.

Persons of ordinary skill in the art will appreciate that the pixel sensor of the present invention will most often be disposed in an array having multiple rows and columns of pixel sensors. Such skilled persons will also appreciate that a single row of pixel sensors according to the present invention in the form of a linear array could be fabricated and that such an embodiment would not require a row-select transistor.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A pixel sensor comprising:
   a photodiode having an anode coupled to a fixed potential and a cathode;
   a first reset transistor having a drain coupled to a first potential, a gate coupled to a first reset signal line providing a signal that toggles between an on state and an off state, and a source;
   a second reset transistor having a drain coupled to said source of said first reset transistor, a gate coupled to a second reset signal line providing a signal that toggles between an on state and an off state, and a source coupled to said cathode of said photodiode;
   a source-follower transistor having a drain coupled to said source of said first reset transistor, a gate coupled to said cathode of said photodiode, and a source; and a row-select transistor having a drain coupled to said source of said source-follower transistor, a gate coupled to a row-select signal line, and a source coupled to a column output line; and wherein:
a dark-reference potential is coupled to said column output line through a third reset transistor having a drain coupled to said dark-reference potential, a source coupled to said column output line, and a gate coupled to a third reset signal line providing a signal that toggles between an on state and an off state.

2. The pixel sensor of claim 1 further including:
a read transistor having a drain coupled to said column output line, a gate coupled to a read signal line, and a source coupled to an output bus; and
a fourth reset transistor having a drain coupled to said column output line, a source coupled to ground, and a gate coupled to a fourth reset signal line providing a signal that toggles between an on state and an off state.

3. The pixel sensor of claim 2 wherein a column-select transistor is disposed between said read transistor and said output bus, said column-select transistor having a drain coupled to said source of said read transistor, a source coupled to said output bus, and a gate coupled to a column-select signal line.

4. An array of pixel sensors organized in rows and columns, comprising:
a plurality of row-select lines, each row select line associated with a different row in the array;
a plurality of column output lines, each column-output line associated with a different column in said array;
a first reset signal line providing a signal that toggles between an on state and an off state;
a second reset signal line providing a signal that toggles between an on state and an off state;
a plurality of pixel sensors, each pixel sensor in a row position and a column position in the array and including:
a photodiode having an anode coupled to a fixed potential and a cathode;
a first reset transistor having a drain coupled to a first potential, a gate coupled to said first reset signal line, and a source;
a second reset transistor having a drain coupled to said source of said first reset transistor, a gate coupled to said second reset signal line, and a source coupled to said cathode of said photodiode;
a source-follower transistor having a drain coupled to said source of said first reset transistor, a gate coupled to said cathode of said photodiode, and a source; and
a row-select transistor having a drain coupled to said source of said source-follower transistor, a gate coupled to the one of said row-select lines associated with the pixel sensor's row position, and a source coupled to the one of said column-output lines associated with the pixel sensor's column position; and
a third reset transistor associated with each column output line, each third reset transistor having a drain coupled to a dark reference potential, a source coupled to its column output line, and a gate coupled to a third reset signal line.

5. The array of claim 4 further including:
a read transistor associated with each column line, each read transistor having a drain coupled to its column output line, a gate coupled to a read signal line, and a source coupled to an output bus; and
a fourth reset transistor associated with each column line, each fourth reset transistor having a drain coupled to its column output line, a source coupled to ground, and a gate coupled to a fourth reset signal line.

6. The array of claim 5, further including:
a plurality of column-select lines, each column-select line associated with a different one of said column-output lines;
a column-select transistor associated with each column-select line, each column-select transistor having a drain coupled to said source of the read transistor associated with its column-output line, a gate coupled to a column-select line, and a source coupled to said output bus; and
an amplifier having an input coupled to said output bus and an output.

7. A method of resetting a group of pixel sensors in an array of pixel sensors, each pixel sensor comprising a photodiode and a source-follower readout transistor, the method comprising:
hard resetting each photodiode in the group of pixel sensors to a supply potential by asserting a first reset signal to enable a first reset transistor for each photodiode and a second reset signal to enable a second reset transistor for each photodiode connected in series with the first reset transistor for that photodiode between the supply potential and that photodiode;
configuring each source-follower readout transistor in the group of pixel sensors to act as a diode-connected transistor by negating the first reset signal to electrically isolate each photodiode from the supply voltage while the second reset signal remains asserted to electrically connect a drain to a gate of each source-follower readout transistor;
soft resetting each photodiode in the group of pixel sensors through its associated diode connected source-follower readout transistor by asserting a third reset signal to electrically connect a column line to a dark reference potential and a row select signal to electrically connect the column line to the associated diode connected transistor.

8. An integrated set of multi-color pixel sensors comprising:
a plurality of pixel sensors, each comprising:
a photodiode having an anode coupled to a fixed potential and a cathode with at least two photodiodes responding to different frequencies of light;
a first reset transistor having a drain coupled to a first potential, a gate coupled to a common first reset signal line providing a signal that toggles between an on state and an off state, and a source;
a second reset transistor having a drain coupled to said source of said first reset transistor, a gate coupled to a common second reset signal line providing a signal that toggles between an on state and an off state, and a source coupled to said cathode of said photodiode; and
a source-follower transistor having a drain coupled to said source of said first reset transistor, a gate coupled to said cathode of said photodiode, and a source;
a row-select transistor having a drain coupled to said source of said source-follower transistor, a gate coupled to a row-select signal line, and a source coupled to a column output line associated with each one of the plurality of pixel sensors; and
a third reset transistor having a drain coupled to a corresponding dark-reference potential, a source coupled to said associated column output line, and a gate coupled to a common third reset signal line providing a signal that toggles between an on state and an off state.

9. The integrated set of multi-color pixel sensors of claim 8 wherein each one of the plurality of pixel sensors further comprises:
   a read transistor having a drain coupled to said associated column output line, a gate coupled to a common read signal line, and a source coupled to an output bus; and
   a fourth reset transistor having a drain coupled to said column output line, a source coupled to ground, and a gate coupled to a fourth reset signal line providing a signal that toggles between an on state and an off state.

10. The integrated set of multi-color pixel sensors of claim 9 wherein:
   for each of the plurality of pixel sensors, a column-select transistor is disposed between said read transistor and said output bus, said column-select transistor having a drain coupled to said source of said read transistor, a source coupled to said output bus, and a gate coupled to a column-select signal line.

11. The integrated set of multi-color pixel sensors in claim 8 wherein:
   the pixel sensors in the plurality of pixel sensors are arranged vertically on an integrated circuit.

12. The integrated set of multi-color pixel sensors in claim 11 wherein:
   the plurality of pixel sensors comprises a red pixel sensor, a blue pixel sensor, and a green pixel sensor.

13. A method of operating a pixel sensor containing a photodiode comprising:
   providing a high first reset signal controlling a first reset transistor and a high second reset signal controlling a second reset transistor connected in series with the first reset transistor to hard reset the photodiode to a supply voltage;
   dropping the first reset signal while the second reset signal remains high to configure a diode connected transistor as a source follower;
   raising a third reset signal controlling a third reset transistor to precharge a column output line to a dark reference voltage;
   raising a row select signal while the second reset signal and the third reset signal are still high to soft reset the photodiode; and
   dropping the second reset signal, the third reset signal, and the row select signal, and raising the first reset signal to expose the photodiode.

14. The method of operating a pixel sensor of claim 13 which further comprises:
   pulsing a fourth reset signal high to place the column output line at ground; and
   asserting a read signal high to place a capacitor connected to the column output line to ground.

15. The method of operating a pixel sensor of claim 14 which further comprises:
   raising the row select signal while the read signal is high and the second reset signal and third reset signals are low to place the contents of the photodiode on the capacitor.

* * * * *